United States Patent [19]

Morse, Jr.

[11] Patent Number: 5,551,916
[45] Date of Patent: Sep. 3, 1996

[54] TORNADO PROTECTION SYSTEM

[76] Inventor: Harry R. Morse, Jr., P.O. Box 20904, Waco, Tex. 76702

[21] Appl. No.: 442,561

[22] Filed: May 16, 1995

[51] Int. Cl.⁶ ..................................................... F24F 11/00
[52] U.S. Cl. ............................ 454/340; 454/361; 454/368
[58] Field of Search .................................... 454/194, 340, 454/358, 361, 362, 363, 368

[56] References Cited

U.S. PATENT DOCUMENTS

| | | | |
|---|---|---|---|
| 302,463 | 7/1884 | Alexander | 454/340 |
| 1,689,246 | 10/1928 | Knapen . | |
| 1,717,399 | 6/1929 | Mosher | 454/340 |
| 1,874,083 | 8/1932 | Clay . | |
| 2,018,997 | 10/1935 | Coulton . | |
| 4,022,117 | 5/1977 | Mallian . | |
| 4,116,213 | 9/1978 | Kamezaki | 454/340 X |
| 4,144,802 | 3/1979 | Babin | 454/353 |
| 4,538,508 | 9/1985 | Ballard . | |
| 5,081,913 | 1/1992 | Gervais | 454/340 |
| 5,435,780 | 7/1995 | Ayles | 454/368 X |

FOREIGN PATENT DOCUMENTS 12139  3/1896  Switzerland ............................ 454/33

Primary Examiner—Harold Joyce
Attorney, Agent, or Firm—Joseph H. McGlynn

[57] ABSTRACT

A pressure stabilizing system for equalizing the pressure within an enclosure and the atmosphere during rapidly developing low pressure atmospheric conditions comprising a duct with a blow out valve or a valve positively operated by an electrical or gas operated system and a pressure detector to activate the electrical or gas operated valve.

10 Claims, 3 Drawing Sheets

TORNADO PROTECTION SYSTEM

BACKGROUND OF THE INVENTION

This invention relates in general to a tornado protection system and in particular to a system that equalizes the outside and inside pressure on a structure to protect the structure from tornado damage.

DESCRIPTION OF THE PRIOR ART

Tornadoes may be found in every part of the world but are particularly prevalent in North America. They strike more frequently in the late spring and early summer months, but there is no time during the year that is completely free of tornadoes. Not only do they cause millions of dollars of property damage each year, they are also responsible for the loss of many lives.

The primary method of destruction caused by tornadoes is an explosion induced by the outside pressure on a structure being quickly reduced thereby creating a huge differential in the difference between the external pressure and the internal pressure on a structure. The much higher internal pressure causes the structure to explode.

While there are other factors present during a tornado, such as direct wind damage from the high winds and damage caused by objects carried by the high winds, these factors cause only relatively minor damage compared to the damage caused by the explosion.

Any effective tornado protection system must, therefore, protect against the catastrophic damage caused by explosion. Therefore, an effective system will require suitable ducting between the inside and outside of a structure, a suitable detection system which will detect a dangerous differential between the external and internal pressure, and valves that will operate to equalize these pressures.

In the prior art pressure stabilizing systems have been proposed, such as in U.S. Pat. No. 4,022,177. In this patent a duct is provided to equalize internal and external pressure on a structure and uses a pivoted plate to close off the duct in a normal pressure situation. However the plate used is merely spring biased and will only open when the pressure inside the structure is high enough to overcome the pressure of the spring. Since springs lose their tension as they age, and since dirt or other debris may interfere with the normal operation of the pivoted plate, this system is prone to severe operational difficulties.

SUMMARY OF THE INVENTION

The present invention overcomes these problems by providing a duct with a blow out valve or with a valve positively operated by an electrical or gas operated system that is not affected by aging. The present system also uses a pressure detector to activate the electrical or gas operated valve, which will not be affected by aging or dirt or other foreign substances.

It is an object of the present invention to provide a tornado protection system that is cost effective, and can be installed on a existing structure.

It is an object of the present invention to provide a tornado protection system that is reliable and will not be affected by the age of the components.

It is an object of the present invention to provide a tornado protection system that is esthetically pleasing in appearance.

These and other objects and advantages of the present invention will be fully apparent from the following description, when taken in connection with the annexed drawings.

DESCRIPTION OF THE PREFERRED EMBODIMENT

Figure 1:
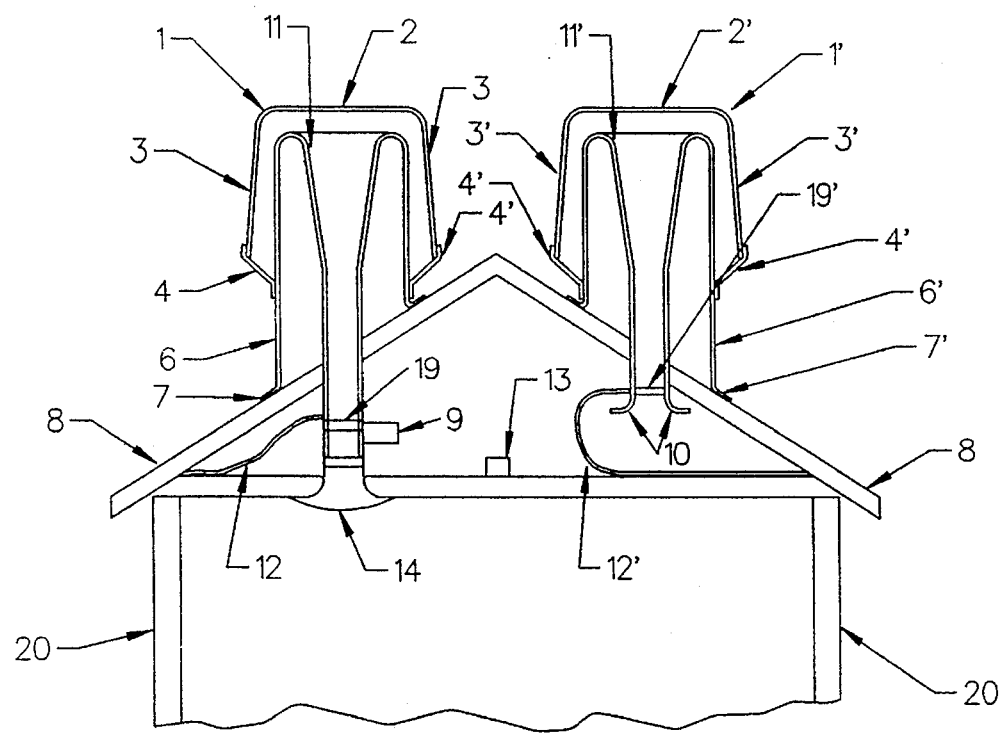
FIG. 1 shows the present invention installed on the roof of a structure.

In FIG. 1 the present invention 1 is shown installed on the roof 8 of a structure 20. The diffusing exits 2 and 2' should be mounted on top of the structure to be protected. The diffusing exit should be omni directional and configured to prevent rain water from entering the structure. In this regard the exits 2 and 2' are circular and have sloping sides 3 and 3' to deflect rain water. Although shapes other than circular could be used for the exit, a circular shape is the most efficient. At the bottom of the sloping walls 3 and 3' is a screen or similar structure 4 and 4' which is designed to prevent animals or insects from entering and clogging up the exit, while allowing a free flow of air out of the structure 20.

Within the exit is ducts or pipes 11 and 11' that communicates between the outside and the inside of the structure. One end of the ducts 11 and 11' is used to mount the unit on the roof 8 and consist of any conventional roof mount such as flanges 7 and 7' which can be nailed to the roof followed by any conventional roof sealer to prevent water from leaking into the structure. The ducts 11 and 11' also have valves 19 and 19' which will normally be closed to prevent heat loss from inside the structure. The location of the valves is not critical as long as they will be in a position to effectively open or close the ducts. Connected to the valves 19 is valve operator 9. Also connected to the ducts 11 and 11' are drain tubes 12 and 12' which will allow any internal moisture in the ducts to drain to the outside.

The duct will end inside the structure with a decorative louvered grill 14. The louvered grill will be used in areas that will be visible from inside the structure for esthetic purposes. In areas where the duct end is not visible (such as in an attic) the decorative louvered grill can be omitted as shown at 10. The only mechanical requirement for the system inlet is low pressure losses. This can be accomplished by providing a well rounded entrance as shown in FIG. 1 at 14 and 10. The preferred radius would be such that the losses would be negligible and will depend on the size of the inlet.

No specific valve is required for the system to operate properly. For example gate valves, butterfly valves, blow out valves, or any other valve may be used, as long as they are of sufficient size and will open quickly and automatically in order to relieve the pressure inside the structure 20. Also, the valves do not have to be powered, but may be hand operated, however a powered, automatically operating valve is preferred for obvious reasons.

The powered valves may be operated by any method including electricity (see 23 and 23' in FIGS. 3 and 4), bottled gas (see 26 and 26' in FIGS. 5 and 6), mechanical or atmospheric pressure. Whatever type of powered valve is chosen it must be capable of operating without a commercially available power source as that may be interrupted by the tornado.

Figure 2:
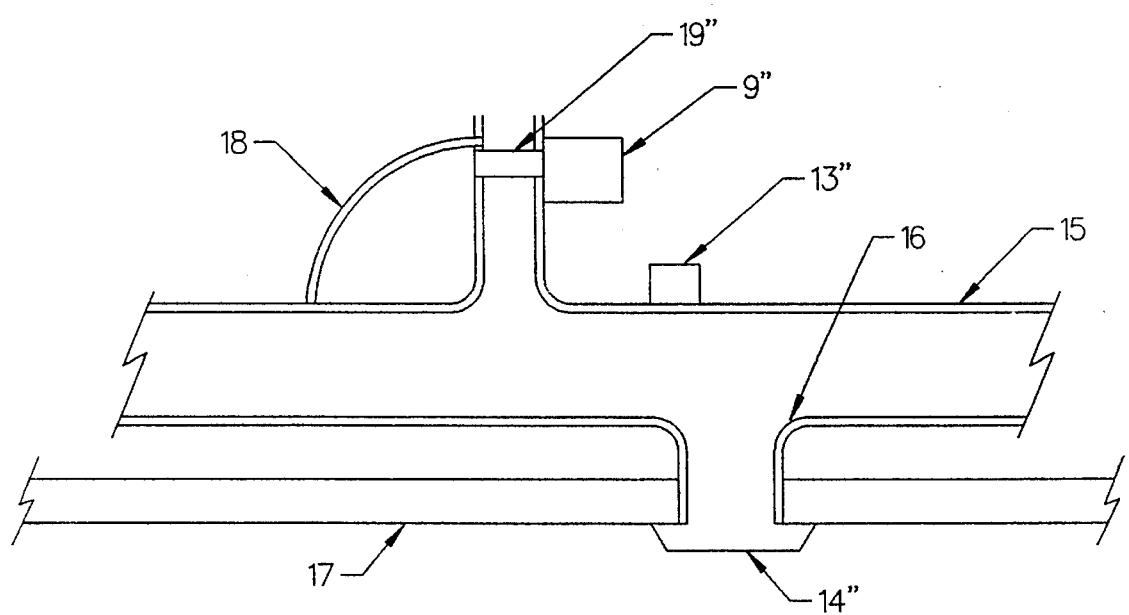
FIG. 2 shows the present invention installed in a duct within a structure.

The ducting for the system may be dedicated ducting as shown in FIG. 1, or it may be incorporated into existing ducts, such as heating and air-conditioning ducts,as shown in FIG. 2 at 15. When incorporating the system into an existing duct similar components will be used, such as a valve 19", valve actuator 9", detector 13", and louvered grill 14", which can be mounted in a ceiling 17 in the normal manner. When adding the system to existing ducts care must be exercised in two areas. The existing ducts must have sufficient capacity to handle the required airflow and the compartment(s) surrounding the ducting must also be protected. This is necessary to prevent crushing of the heating and/or cooling system ducts because the external pressure will be higher than the internal pressure. The crushing of the ducts would impede the air flow in the ducts and, therefore resulting in a reduction in air transfer capacity.

The exit portion of the duct must provide a flow path that is downward and outward, as shown in FIG. 1 to prevent exit losses. The screens 4 and 4' must be installed so as to minimize the restriction imposed by the screen and thereby minimize the pressure losses associated with it. The exit must provide a high diffusion area ratio and must be designed so that boundary layer separation will not occur.

The detector 13 can take many forms. All that is needed is an instrument that will measure a pressure differential between the inside of the structure and the outside, or an absolute pressure. As soon as a pressure differential is detected, the detector 22 or 22' of the electrical system (shown in FIGS. 3 and 4) operated by battery 23 and 23' will turn on the actuator 21 or 21' which will open valves 19, 19', or 19" (in FIGS. 1 and 2) which will open the ducts leading between the inside and outside of the structure. The gas operated system (shown in FIGS. 5 and 6) will operate in the same manner. The detector 24 or 24' of the gas system operated by bottled gas 26 or 26' will turn on the actuator 25 or 25' which will open valves 19, 19', or 19" (in FIGS. 1 and 2) which will open the ducts leading between the inside and outside of the structure.

Figure 3:
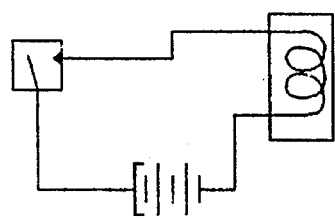
FIG. 3 shows a schematic of a one valve electrical system.
Figure 4:
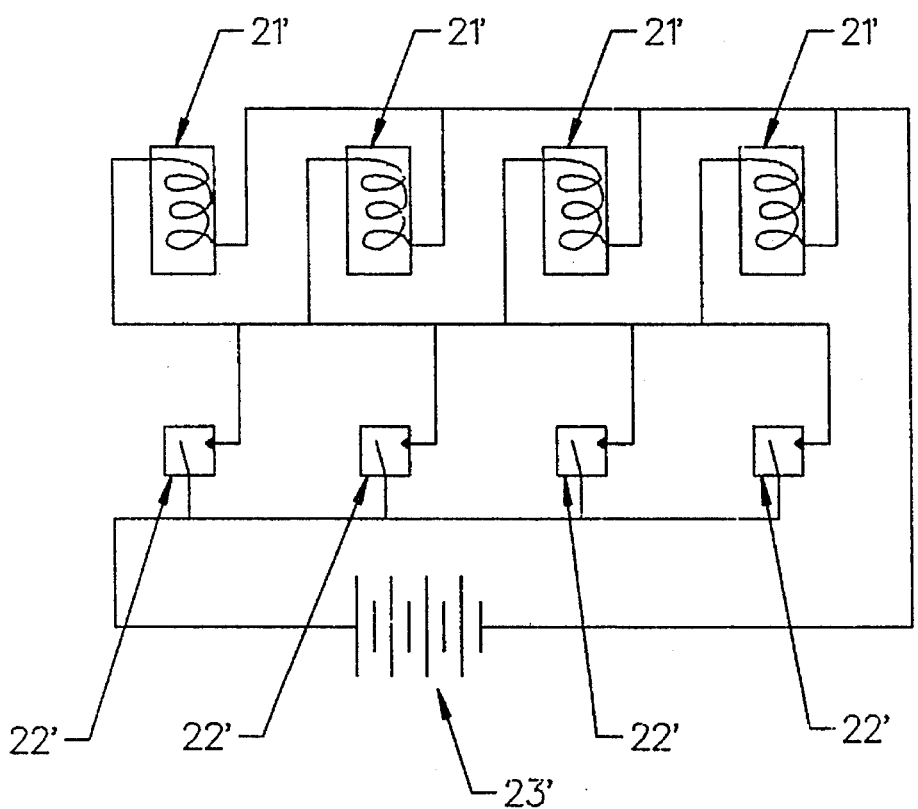
FIG. 4 shows a schematic of a multiple valve electrical system.
Figure 5:
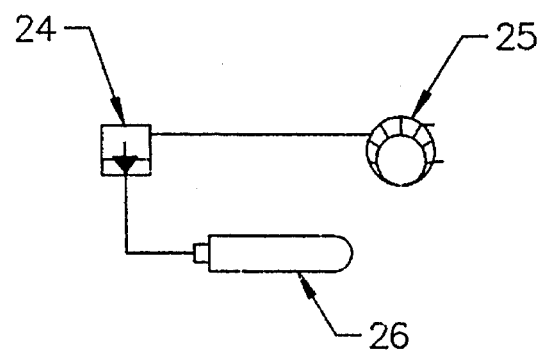
FIG. 5 shows a schematic of a one valve gas operated system.
Figure 6:
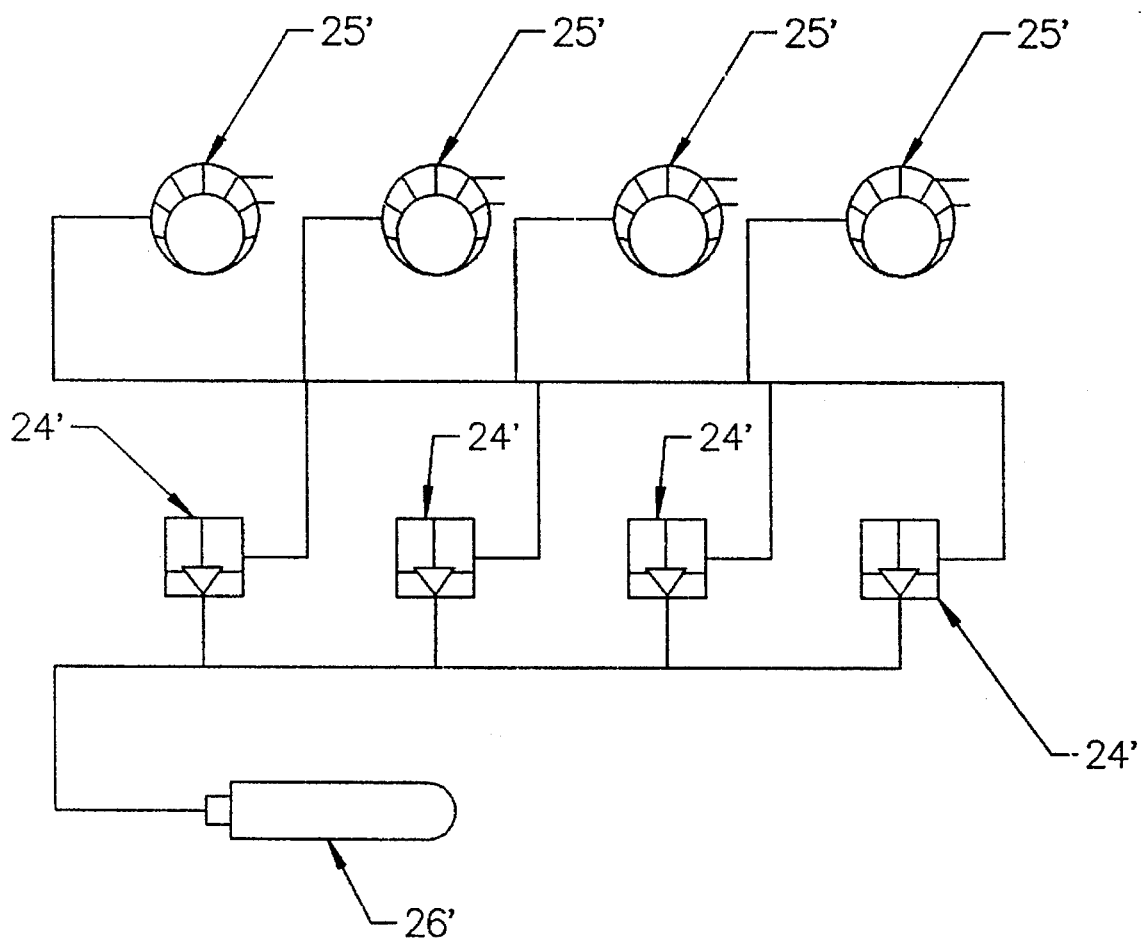
FIG. 6 shows a schematic of a multiple valve gas operated system.

Also the detectors and actuators may be a single detector and actuator as shown in FIGS. 3 and 4 or in a more complex system may consist of multiple detectors and actuators as shown in FIGS. 5 and 6.

Structures with multiple rooms which do not readily communicate with each other must be handled individually and may require separate systems. For example, in FIG. 1 a separate vent 2 is shown leading into the interior of the structure with a second vent 2' being used to vent the attic area. Alternatively, since an attic is normally vented to the outside, the valve and detector could be eliminated from the attic system.

Many different types of detectors may be used in the present invention. The following are merely examples that might be used and should not be construed as an all inclusive list of detectors.

PRESSURE DIFFERENCE

This type is connected to the tornado protection system by means of two small tubes. The tubes are connected to pressure taps in the wall of the duct. One tap is located outside the valve to pick up outside pressure and the other is located inside the valve to pick up inside pressure. The mechanism of the detector consists of a diaphragm, a bellows, a piston or a bourdon tube. These devices are moved by the inside and outside pressures so that an electric switch is operated or they can trigger the release of a spring loaded valve. The electric switch facilitates the operation of the electrically powered unit and the spring loaded valve facilitates the operation of the gas powered unit.

ABSOLUTE PRESSURE

This type is connected to the tornado protection system by means of a single tube connected to a pressure tap located outside the valve in order to pick up outside pressure. Its mechanism consists of a simple aneroid bellows that operates an electrical switch or triggers the release of a spring loaded valve at some predetermined deflection that corresponds to some specific, preselected absolute pressure.

RATE OF PRESSURE CHANGE

This type is connected to the tornado protection system by means of a single tube connected to a pressure tap in the duct located outside the valve in order to pick up outside pressure. Its mechanism consists of a simple aneroid bellows with a capillary bleed. The bellows operates an electrical switch or triggers the release of a spring loaded valve at some predetermined deflection that corresponds to a specific, preselected time-pressure gradient. The mechanism is in general similar to the system used in aircraft rate of climb indicators.

In general, in all of the above examples, the tubes need not be connected to the tornado protection system, but can be connected at any convenient location. However, by connecting the tubes to the tornado protection system you know that the required pressures are available at this location.

Although the tornado protection system and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A pressure stabilizing system for equalizing the pressure within an enclosure and the atmosphere during rapidly developing low pressure atmospheric conditions comprising: a duct communicating between the inside and outside of said enclosure, a valve means for normally closing said duct, means for detecting a rapidly developing low pressure atmospheric conditions, and actuator means for automatically opening said valve during said rapidly developing low pressure atmospheric conditions.

2. The pressure stabilizing system as claimed in claim 1, wherein said actuator means is activated by a detector means which measures a pressure difference between the inside and outside of said enclosure.

3. The pressure stabilizing system as claimed in claim 2, wherein said actuator means is electrically operated.

4. The pressure stabilizing system as claimed in claim 2, wherein said actuator means is gas operated.

5. The pressure stabilizing system as claimed in claim 1, wherein a drain line is connected to said duct for draining moisture from said duct.

6. The pressure stabilizing system as claimed in claim 1, wherein said duct is connected to an existing heating/air conditioning duct within said enclosure.

7. The pressure stabilizing system as claimed in claim 1, wherein said duct has a curved top which prevents moisture from entering said duct.

8. The pressure stabilizing system as claimed in claim 1, wherein said duct has a screen connected to it to prevent animals or insects from entering said duct.

9. The pressure stabilizing system as claimed in claim 1, wherein said actuator means is activated by a detector means which measures a difference in absolute pressure between the inside and outside of said enclosure.

10. The pressure stabilizing system as claimed in claim 1, wherein said actuator means is activated by a detector means which measures a difference in pressure over a preselected period of time between the inside and outside of said enclosure.

\* \* \* \* \*